US007673715B2

(12) United States Patent
Takechi

(10) Patent No.: US 7,673,715 B2
(45) Date of Patent: Mar. 9, 2010

(54) GEARED MOTOR FOR ELECTRIC WHEELCHAIR

(75) Inventor: Tetsuo Takechi, Hannda (JP)

(73) Assignee: Sumitomo Heavy Industries, Ltd., Tokyo (JP)

(*) Notice: Subject to any disclaimer, the term of this patent is extended or adjusted under 35 U.S.C. 154(b) by 790 days.

(21) Appl. No.: 10/960,570

(22) Filed: Oct. 8, 2004

(65) Prior Publication Data

US 2005/0077790 A1 Apr. 14, 2005

(30) Foreign Application Priority Data

Oct. 10, 2003 (JP) ............................ 2003-352792

(51) Int. Cl.
*A61G 5/04* (2006.01)

(52) U.S. Cl. ..................................... 180/65.6; 180/907

(58) Field of Classification Search ................ 180/65.1, 180/65.6, 907, 908

See application file for complete search history.

(56) References Cited

U.S. PATENT DOCUMENTS

| | | | |
|---|---|---|---|
| 4,274,503 | A | 6/1981 | Mackintosh |
| 5,135,063 | A | 8/1992 | Kropf |
| 5,291,798 | A | 3/1994 | Tanigawa et al. |
| 5,752,710 | A | 5/1998 | Roberts |

FOREIGN PATENT DOCUMENTS

| | | | |
|---|---|---|---|
| DE | 43 05 592 A 1 | | 2/1993 |
| JP | 55-98848 | | 12/1978 |
| JP | 56-1277 | | 6/1979 |
| JP | 62-163648 | | 10/1987 |
| JP | 63-187562 | | 12/1988 |
| JP | H05-008722 | * | 1/1993 |
| JP | H09-118143 | * | 5/1997 |
| JP | H09-296829 | * | 11/1997 |
| JP | 11-173413 A | | 6/1999 |
| JP | 2000-070304 | | 3/2000 |
| JP | 2003-019165 | * | 1/2003 |
| WO | WO 00/59440 | | 10/2000 |

* cited by examiner

*Primary Examiner*—Frank B Vanaman
(74) *Attorney, Agent, or Firm*—Squire, Sanders & Dempsey, LLP

(57) ABSTRACT

A geared motor for driving an electric wheelchair, which can realize features such as light weight, compact size, low noise, and low vibration at the same time, as well as high performance at low cost. In a driving device of an electric wheelchair for driving a wheel shaft by the power of a motor, the motor is disposed in such a manner that a motor shaft thereof is orthogonal to the wheel shaft. A hypoid speed reduction mechanism having a hypoid pinion and a hypoid gear intervenes between the motor shaft and the wheel shaft.

3 Claims, 4 Drawing Sheets

GEARED MOTOR FOR ELECTRIC WHEELCHAIR

BACKGROUND OF THE INVENTION

1. Field of the Invention

The present invention relates to a geared motor used in a driving device for an electric wheelchair.

2. Description of the Related Art

In recent years, a wheelchair is widely used by elderly people who find it difficult to walk, people who move around in a hospital, and people with a mobility impairment, when navigating flat roads, sidewalks, and flat floor in doors.

In many cases, people who use the wheelchair are difficult to manually maneuver its wheels. It is not always possible that there is an attendant with them. Against this backdrop, the so-called electric wheelchair, in which wheel shafts are driven by the power of motors, has been recently proposed in large numbers (refer to, for example, Japanese Patent Laid-Open Publication No. 2000-70304).

FIG. 4 shows an electric wheelchair disclosed in Japanese Patent Laid-Open Publication No. 2000-70304.

A wheelchair 1 comprises a frame 2, safety wheels 4 attached in front of the frame 2 (left side in FIG. 4), driving wheels 5 attached in the rear of the frame 2 (right side in FIG. 4), and an operation control panel 6 attached above and anterior to the frame 2. In this wheelchair 1, a battery 7 and a motor (not illustrated) drive a wheel shaft 12 of the driving wheel 5. The motor is disposed in such a manner that its motor shaft (not illustrated) is in parallel with the wheel shaft 12, and the power of the motor is transmitted to the wheel shaft 12 via a not-illustrated mechanism with parallel gears.

Especially in consideration of use in a hospital and a home, a driving device for the electric wheelchair is required to have low noise. Also, vibration must be as small as possible, in addition to light weight and compact size.

A conventional driving device for the electric wheelchair, however, does not always agree with such requirements.

SUMMARY OF THE INVENTION

In view of the foregoing problems, various exemplary embodiments of this invention provide a geared motor suitably applied to a driving device for an electric wheelchair, which can achieve features such as low noise, low vibration, light weight, and compact size.

To achieve the foregoing object, a geared motor according to one of the exemplary embodiments, the invention comprises a motor and a speed reducer for reducing the speed of rotation of the motor. The geared motor is used in a driving device for an electric wheelchair to drive a wheel shaft of the wheelchair by the power of the motor. In the geared motor, the speed reducer comprises a hypoid pinion rotated by a motor shaft of the motor, a hypoid gear engageable with the hypoid pinion, and an output shaft disposed in parallel with a center axis of the hypoid gear.

According to the exemplary embodiment of this invention, since the motor shaft of the motor is disposed orthogonally to the wheel shaft of the wheelchair, it is possible to make the geared motor compact.

A hypoid speed reduction mechanism having the hypoid pinion and the hypoid gear intervenes between the motor shaft and the wheel shaft, so that it is possible to achieve the change of direction of a rotation shaft to an orthogonal direction and speed reduction. Furthermore, since the hypoid speed reduction mechanism can have a higher speed reducing ratio than a bevel gear or the like, it is possible to reduce the number of speed reduction stages (for example, reduce from three stages to two stages) on the whole driving device. Reduction in the number of the speed reduction stages especially contributes to making the geared motor light in weight and compact.

Furthermore, the hypoid speed reduction mechanism can set its engagement ratio high, so that it is also possible to achieve low noise and low vibration. Since the transmission efficiency of the hypoid speed reduction mechanism is not so low, the electric power consumption of a battery hardly increases.

According to the exemplary embodiments of this invention, it is possible to achieve the features required of the electric wheelchair such as light weight, compact size, low noise, and low vibration at the same time.

BRIEF DESCRIPTION OF THE DRAWINGS

Various exemplary embodiments of the present invention will be described in detail with reference to the accompanying drawings, wherein.

DETAILED DESCRIPTION OF PREFERRED EMBODIMENTS

Various exemplary embodiments of this invention will be hereinafter described in detail with reference to the drawings.

Figure 1:
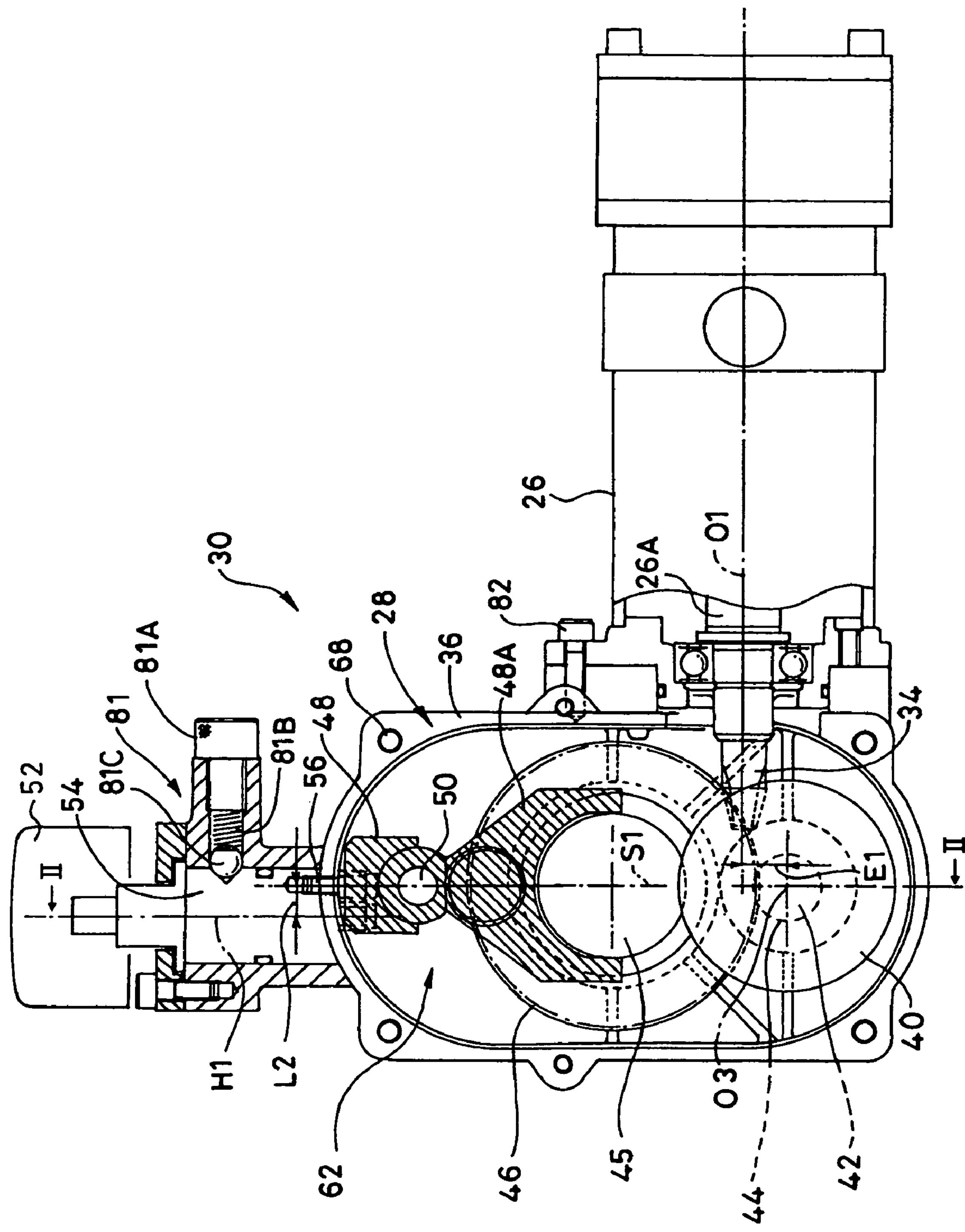
FIG. 1 is a partial cutaway front view showing the essential structure (a geared motor section) of an example of a driving device for an electric wheelchair to which an exemplary embodiment of this invention is applied.
Figure 2:
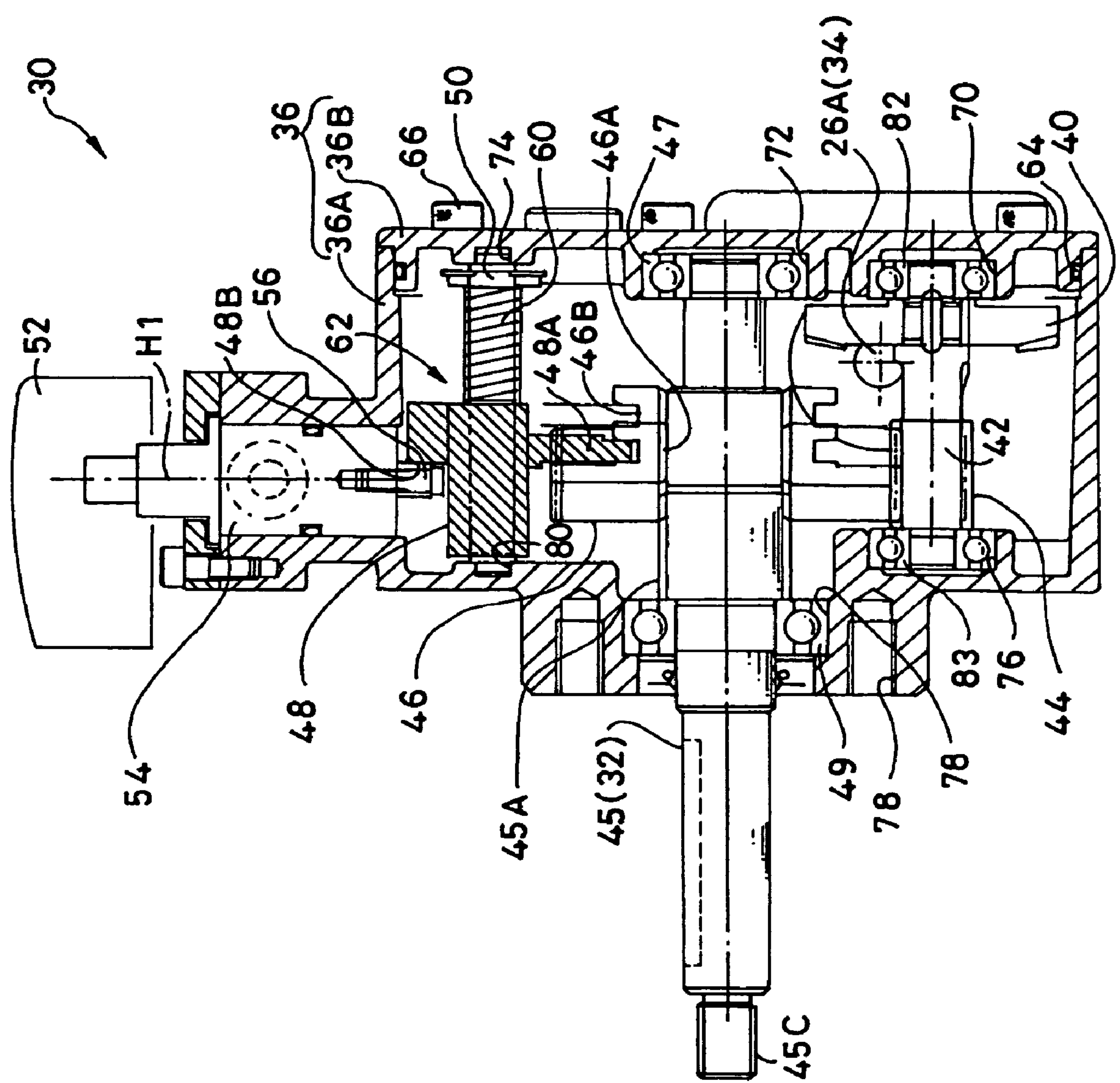
FIG. 2 is a sectional view taken along the line II-II in FIG. 1.
Figure 3:
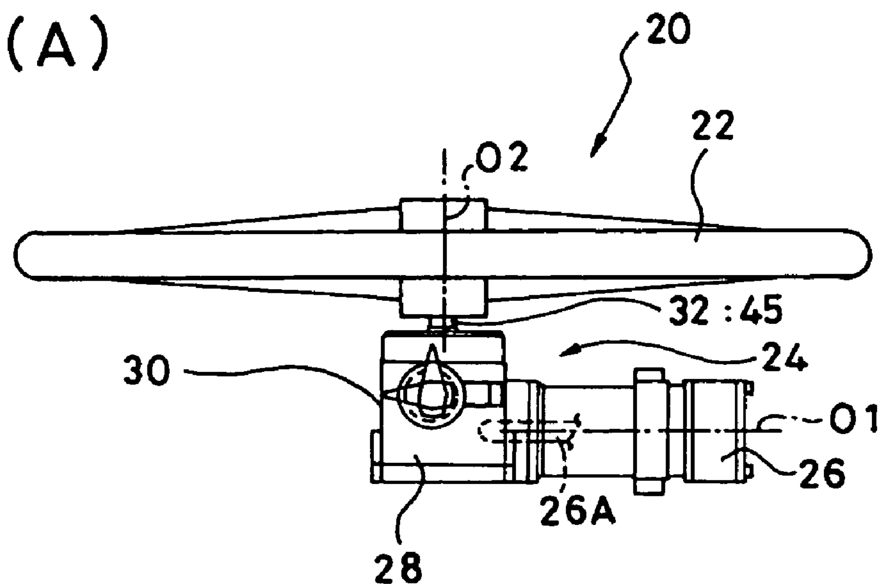
FIGS. 3A and 3B show the whole driving device, FIG. 3A being a plan view and FIG. 3B being a front view.
Figure 3:
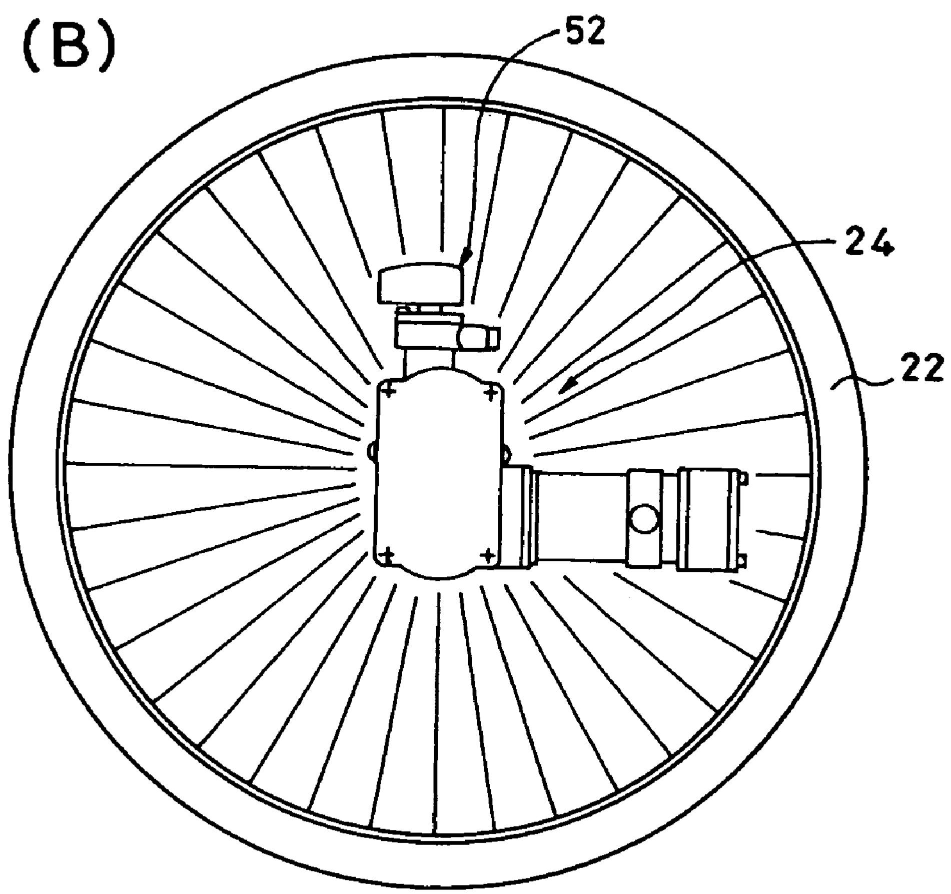
Figure 4:
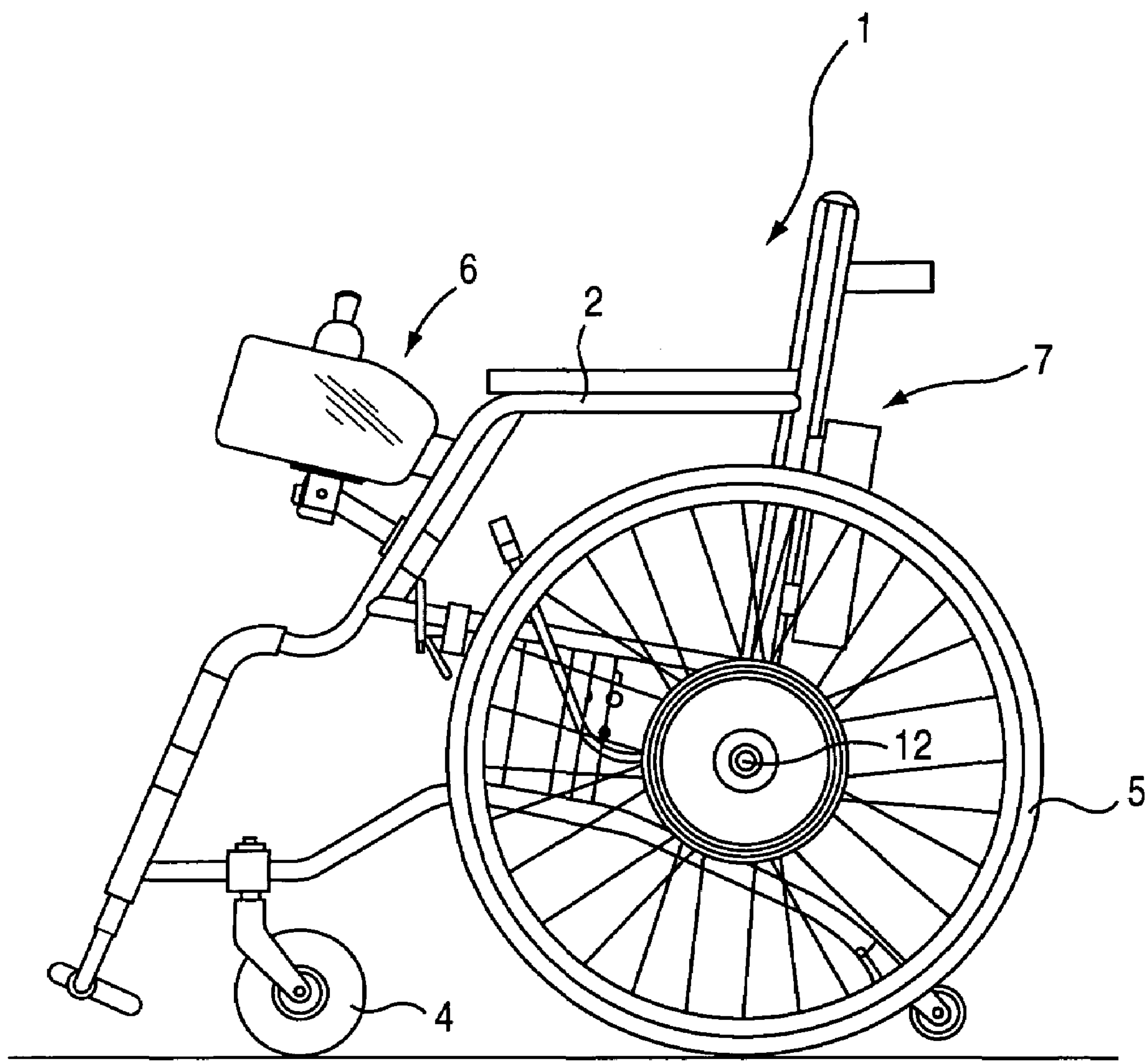
FIG. 4 is a side view showing the whole structure of a conventional electric wheelchair.

FIG. 1 is a partial cutaway front view showing the essential structure (a geared motor section) of a driving device for an electric wheelchair, to which the exemplary embodiment of this invention is applied. FIG. 2 is a longitudinal sectional view of the driving device. FIGS. 3A and 3B show the whole driving device, FIG. 3A being a plan view and FIG. 3B being a front view.

The whole schematic structure of the driving device will be first described with reference to FIGS. 3A and 3B. FIGS. 3A and 3B show a driving device 24 for a driving wheel 22 on one side of an electric wheelchair 20. A driving device for a driving wheel on the other side is not illustrated because it is exactly symmetric to the driving device 24.

Referring to FIGS. 3A and 3B, the driving device 24 comprises a hypoid geared motor 30 which includes a DC motor 26 and a hypoid speed reducer 28. The DC motor 26 is disposed in such a manner that the center axis O1 of a motor shaft 26A thereof is orthogonal to the center axis O2 of a wheel shaft 32 of the driving wheel 22 of the electric wheelchair 20. The hypoid geared motor 30 transforms the rotation direction of the DC motor 26 by 90 degrees. An output shaft (45) of the hypoid geared motor 30 doubly functions as the wheel shaft 32 of the driving wheel 22 of the electric wheelchair 20.

Referring to FIGS. 1 and 2, a hypoid pinion 34 is formed at an end of the motor shaft 26A of the DC motor 26 by gear cutting. The hypoid pinion 34 faces to the inside of a main body 36A of a casing 36 of the hypoid speed reducer 28. The hypoid pinion 34 is engaged with a hypoid gear 40. A center axis O1 of the hypoid pinion 34 (namely, the center axis O1 of the motor shaft 26A) and the center axis O3 of a counter shaft 42, to which the hypoid gear 40 is attached, orthogonally intersect with each other at a shifted amount E1 away in a plan view.

A second stage pinion 44 is directly formed in the counter shaft 42. The second stage pinion 44 is engaged with an output gear 46 which is slidably attached to the output shaft 45. The output shaft 45 is disposed in parallel with the counter shaft 42 (namely, orthogonally to the motor shaft 26A) through bearings 47 and 49. As described above, the output shaft 45 doubly functions as the wheel shaft 32 of the driving wheel 22 of the electric wheelchair 20. A male spline (external gear) 45A is formed in a part of the outer periphery of the output shaft 45. The output gear 46, on the other hand, is slidably attached to the output shaft 45. A female spline 46A, which is engageable with the male spline 45A, is formed in the inner periphery of the output gear 46. In other words, while the output gear 46 is an external gear engaged with the second stage pinion 44, the output gear 46 also serves as an internal gear engaged with the male spline 45A.

A ring-shaped recessed portion 46B is formed at a part of the outer periphery of the output shaft 46. An engaging portion 48A of a slide member 48 is engaged with the recessed portion 46B. The slide member 48 is slidable along a slide pin 50 separately provided in parallel with the output shaft 45. A cam face 48B is formed in the slide member 48 on the opposite side of the engaging portion 48A (an upper portion in the hypoid geared motor 30). A handle 52 is provided with an eccentric cam shaft 54. The eccentric cam shaft 54 integrally rotates with the handle 52 around its central axis H1. A pin 56 is inserted into the eccentric cam shaft 54 at a predetermined distance L2 away from the central axis H1. Namely, the pin 56 is rotatable in accordance with the rotation of the handle 52 around the central axis H1, and capable of pressing the cam face 48B of the slide member 48. The slide member 48 is movable only along the slide pin 50, so that it is possible to obtain force (component of force) for driving the slide member 48 in the direction of the slide pin 50 by pressing force from the pin 56. The slide member 48 is always biased in a left direction of the drawing (a direction for engaging the female spline 46A of the output gear 46 with the male spline 45A of the output shaft 45) by a spring 60.

The handle 52, the eccentric cam shaft 54, the slide member 48, the female spline 46A of the output gear 46, and the male spline 45A of the output shaft 45 constitute a clutch mechanism 62 for connecting and disconnecting power transmission between the wheel shaft 32 (output shaft 45) and the hypoid gear 40.

The casing 36 of the hypoid speed reducer 28 mainly comprises the main body 36A and a cover 36B, which are integrated with attachment bolts 66 through a seal ring 64. The cover 36B has support holes 70, 72, and 74 for supporting each shaft in the hypoid speed reducer 28, that is, the counter shaft 42, the output shaft 45, and the slide pin 50. The main body 36A of the casing 36 has corresponding support holes 76, 78, and 80. The counter shaft 42 is rotatably supported by the support holes 70 and 76 through bearings 82 and 83. The output shaft 45 is rotatably supported by the support holes 72 and 78 through bearings 48 and 49.

The slide pin 50 is rotatably supported by the support holes 74 and 80 directly. The centers of the support holes 70, 72, and 74 formed in the cover 36B are arranged in the same virtual plane S1. The attachment holes (refer to corresponding holes 68 in the main body 36A), into which the attachment bolts 66 for attaching the cover 36B to the main body 36A are inserted, are formed symmetrically with respect to the virtual plane S1. This is because the hypoid speed reducer 28 including the cover 36B is made available in either of the left and right driving wheels 22 of the electric wheelchair 20.

The hypoid speed reducers 28 are symmetrically mounted on a not-illustrated frame of the electric wheelchair 20 via bolt holes 78. The right and left driving wheels 22 are attached to the output shafts 45, respectively. An external thread 45C formed at an end of the output shaft 45 is screwed into a nut (not illustrated) for securing the driving wheel 22. In other words, this hypoid speed reducer 28 functions as a "bearing box" which supports the driving wheel 22 of the electric wheelchair 20 in a cantilever state on the whole.

The reference numeral 81 in the drawing refers to a positioning mechanism of the eccentric cam shaft 54. The positioning mechanism 81 comprising a bolt 81A, a spring 81B, and a ball 81C locks the movement of the eccentric cam shaft 54 in the direction of the central axis H1. The reference numeral 82 refers to a bolt for coupling the DC motor 26 to the main body 36A of the casing 36 of the hypoid speed reducer 28.

Next, the operation of the driving device 24 for the electric wheelchair 20 according to this exemplary embodiment will be described.

When the motor shaft 26A of the DC motor 26 rotates, the hypoid pinion 34 formed at the end of the motor shaft 26A integrally rotates. The rotation of the hypoid pinion 34 is transmitted to the hypoid gear 40 engaged with the hypoid pinion 34, so that the second stage pinion 44 which is directly formed in the counter shaft 42 by gear cutting rotates. The rotation of the second stage pinion 44 is transmitted to the output gear 46.

In normal use, the position of the handle 52 fixes the slide member 48 in a position illustrated by solid lines in FIG. 2 with the function of the spring 60. Thus, the female spline 46A of the output gear 46 is engaged with the male spline 45A of the output shaft 45, so that the rotation of the output gear 46 directly becomes the rotation of the output shaft 45 (namely, the wheel shaft 32) to rotate the driving wheel 22.

When, for example, the electric wheelchair is used in home, on the other hand, there are cases where directly rotating the driving wheel 22 by hand is more convenient than drive by the DC motor 26. In such cases, if the wheel shaft 32 (namely, the output shaft 45) is coupled to the motor shaft 26A through the second stage pinion 44, the hypoid gear 40, and the hypoid pinion 34, high driving resistance will be generated. Therefore, in those cases, the handle 52 is rotated to rotate the pin 56 of the eccentric cam shaft 54 with respect to the central axis H1. By the rotation, the slide member 48 can obtain the component of force in the axial direction of the slide pin 50 from the pin 56 through the cam face 48B. Thus, the slide member 48 slides in the right direction of FIG. 2 against the bias of the spring 60, to slide the output gear 46 in the right direction of FIG. 2 through the engaging portion 48A. As a result, engagement between the female spline 46A of the output gear 46 and the male spline 45A of the output shaft 45 is released, and hence the output shaft 45 (the wheel shaft 32) is detached from a power transmission system from the DC motor 26. As a result, a user can easily rotate the driving wheel 22 due to the existence of the clutch mechanism 62.

In the clutch mechanism 62, engagement and disengagement between the male spline 45A and the female spline 46A are carried out by sliding the output gear 46 having the female spline 46A along the output shaft 45 with respect to the male spline 45A formed in the output shaft 45. Therefore, the structure of the clutch mechanism 62 itself is simple, and hence it is possible to reduce cost.

Furthermore, the slide member 48, which is slidable on the slide pin 50 disposed in parallel with the output shaft 45, realizes a slide of the output gear 46 along the output shaft 45. Thus, since a space above the wheel shaft 32 relatively having spatial room can be used advantageously, it is possible to secure a large space below the wheel shaft 32. Accordingly, operation for striding a small obstacle becomes possible, and hence it is possible to increase flexibility in drive.

In this driving device 24, since the output shaft 45 of the hypoid speed reducer 28 doubly functions as the wheel shaft 32 of the driving wheel 22 of the electric wheelchair 20 as-is, it is possible to easily attach and detach the driving wheel 22, so that maintenance becomes easy.

Furthermore, the attachment holes formed in the cover 36B of the casing 36 for attaching the cover 36B to the main body 36A, the corresponding holes 68 formed in the main body 36A, and the support holes 70, 72, 74, 76, 78, and 80 for supporting the respective axes 42, 45, and 50 in the speed reducer 28, are symmetric with respect to the virtual plane, which contains the centers of the support holes 70, 72, 74, 76, 78, and 80. Therefore, the cover 36B of the casing 36 is available in either of the hypoid geared motors 30 for the left and right driving wheels 22. In other words, the identical covers 36B are available in both of the main body 36A the right side of which in the drawing is open as shown in FIG. 2, and a main body (not illustrated) the left side of which is open (used for the other driving wheel 22). Therefore, it is possible to reduce cost of the whole electric wheelchair 20.

According to the exemplary embodiments of this invention, it is possible to concurrently achieve features required of the electric wheelchair such as light weight, compact size, low noise, and low vibration, and to provide the geared motor for driving the electric wheelchair with high performance at low cost.

The disclosure of Japanese Patent Application No. 2003-352792 filed Oct. 10, 2003 including specification, drawings and claims is incorporated herein by reference in its entirety.

What is claimed is:

1. A geared motor for an electric wheelchair to drive a wheel shaft of the wheelchair comprising:

a motor, the motor having a motor shaft; and a speed reducer for reducing the speed of rotation of the motor shaft;

wherein the speed reducer comprises:

a hypoid pinion rotated by the motor shaft;

a hypoid gear engageable with the hypoid pinion;

an output shaft disposed in parallel with a center axis of the hypoid gear to drive the wheel shaft and orthogonal to the motor shaft;

a clutch mechanism disposed between the output shaft and the hypoid gear, for connecting and disconnecting power transmission between the output shaft and the hypoid gear wherein the clutch mechanism further includes an external gear fixed on the output shaft; and an internal gear slidably mounted on the output shaft, the internal gear being engageable with the external gear, the internal gear and the external gear being engaged or disengaged with each other by sliding the internal gear along the output shaft.

2. The geared motor for an electric wheelchair according to claim 1, wherein the clutch mechanism further comprises:

a slide member slidable on a slide pin disposed in parallel with the output shaft, the internal gear being slid along the output shaft in conjunction with a slide of the slide member on the slide pin.

3. The geared motor for an electric wheelchair according to claim 1, wherein the speed reducer comprises a casing main body and a casing cover, the casing main body and the casing cover have support holes to support each shaft in the speed reducer and attachment holes for attaching the casing cover to the casing main body respectively, and the attachment holes are formed symmetrically with respect to a virtual plane which contains center axes of the support holes.

* * * * *